US012078172B2

(12) United States Patent
Tsuchiya et al.

(10) Patent No.: US 12,078,172 B2
(45) Date of Patent: Sep. 3, 2024

(54) MULTI-STAGE SCREW COMPRESSOR

(71) Applicant: Hitachi Industrial Equipment Systems Co., Ltd., Tokyo (JP)

(72) Inventors: Takeshi Tsuchiya, Tokyo (JP); Kotaro Chiba, Tokyo (JP); Toshiaki Yabe, Tokyo (JP); Shigeyuki Yorikane, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/278,431

(22) PCT Filed: Mar. 2, 2022

(86) PCT No.: PCT/JP2022/008872
§ 371 (c)(1),
(2) Date: Aug. 23, 2023

(87) PCT Pub. No.: WO2022/202163
PCT Pub. Date: Sep. 29, 2022

(65) Prior Publication Data

US 2024/0141896 A1 May 2, 2024

(30) Foreign Application Priority Data

Mar. 23, 2021 (JP) ................................ 2021-048480

(51) Int. Cl.
*F04C 23/00* (2006.01)
*F04C 18/08* (2006.01)
(Continued)

(52) U.S. Cl.
CPC ............ *F04C 23/001* (2013.01); *F04C 18/08* (2013.01); *F04C 18/084* (2013.01); *F04C 18/16* (2013.01);
(Continued)

(58) Field of Classification Search
CPC ...... F04C 23/001; F04C 18/08; F04C 18/084; F04C 18/16; F04C 2240/20; F25B 1/047; F05B 2260/4031
See application file for complete search history.

(56) References Cited

U.S. PATENT DOCUMENTS 3,209,990 A * 10/1965 Akerman ................ F04C 18/16 418/179
3,467,300 A * 9/1969 Schibbye ............ F04C 29/0021 418/9
(Continued)

FOREIGN PATENT DOCUMENTS

JP 52-142217 U 10/1977
JP 2004-144035 A 5/2004
(Continued)

OTHER PUBLICATIONS

International Search Report (PCT/ISA/210) issued in PCT Application No. PCT/JP2022/008872 dated May 17, 2022 with English translation (4 pages).
(Continued)

*Primary Examiner* — Dominick L Plakkoottam
*Assistant Examiner* — Paul W Thiede
(74) *Attorney, Agent, or Firm* — Crowell & Moring LLP

(57) ABSTRACT

A multi-stage screw compressor includes a plurality of stages of compressor bodies that compress a gas in sequence. Each of the stages of compressor bodies has both male and female rotors that are housed revolvably in a casing in a mutually meshing state. The male and female rotors each include a rotor lobe section having a suction-side end face and a discharge-side end face on one end and the other end thereof in the axial direction and having a twisted lobe extending from the suction-side end face to the discharge-side end face. The male and female rotors in a downstream-stage compressor body of at least one certain
(Continued)

stage, excluding an upstream-stage compressor body as the first stage, among the plurality of stages of compressor bodies are each configured such that their lead increases from the suction side in the axial direction of the rotor lobe section toward the discharge side.

8 Claims, 9 Drawing Sheets

(51) Int. Cl.
*F04C 18/16* (2006.01)
*F25B 1/047* (2006.01)

(52) U.S. Cl.
CPC .......... *F25B 1/047* (2013.01); *F04C 2240/20* (2013.01); *F05B 2260/4031* (2013.01)

(56) References Cited

U.S. PATENT DOCUMENTS

| | | | | |
|---|---|---|---|---|
| 3,807,911 A | | 4/1974 | Caffrey | |
| 3,910,731 A | * | 10/1975 | Persson | F04C 18/16 418/9 |
| 4,076,468 A | * | 2/1978 | Persson | F04C 18/16 418/9 |
| 4,153,395 A | * | 5/1979 | O'Neill | F04C 29/12 418/104 |
| 2018/0119601 A1 | * | 5/2018 | Lin | F04C 18/16 |
| 2022/0341423 A1 | | 10/2022 | Tanimoto et al. | |

FOREIGN PATENT DOCUMENTS

| | | |
|---|---|---|
| JP | 2020-139487 A | 9/2020 |
| WO | WO 2021/070548 A1 | 4/2021 |

OTHER PUBLICATIONS

Japanese-language Written Opinion (PCT/ISA/237) issued in PCT Application No. PCT/JP2022/008872 dated May 17, 2022 with English translation (7 pages).

International Preliminary Report on Patentability (PCT/IB/338 & PCT/IB/373) issued in PCT Application No. PCT/JP2022/008872 dated Oct. 5, 2023, including English translation of document C2 (Japanese-language Written Opinion (PCT/ISA/237), filed on Aug. 23, 2023) (6 pages).

* cited by examiner

COMPARATIVE EXAMPLE

MULTI-STAGE SCREW COMPRESSOR

TECHNICAL FIELD

The present invention relates to a multi-stage screw compressor that compresses a gas stepwise at a plurality of stages.

BACKGROUND ART

Screw compressors have been used widely as air compressors or compressors for refrigeration and air-conditioning, and there is a strong demand for energy conservation of screw compressors in recent years. Accordingly, it has been becoming increasingly more important to achieve high energy efficiency and large air volumes (high-performance) with screw compressors.

A screw compressor includes a pair of male and female screw rotors that revolve while meshing with each other, and a casing that houses both the screw rotors. Both the screw rotors have helical lobes (grooves). This compressor sucks in and compresses a gas through an increase and decrease, along with revolutions of both the screw rotors, in the volumes of a plurality of working chambers formed by the grooves of both the screw rotors and the inner wall face of the casing surrounding both the screw rotors.

In the screw compressor, a micro-clearance is provided between the revolving screw rotors and the casing such that they do not contact each other. For example, a clearance (hereinafter, referred to as an outer diameter clearance, in some cases) is provided between lobe tips of each screw rotor and the inner circumferential face in the casing. Accordingly, through the outer diameter clearance, a compressed gas undesirably leaks from a working chamber with a relatively high pressure to a working chamber with a relatively low pressure. When the compressed gas leaks, spent compression power is wasted and power for recompression is required by a corresponding degree, and thus the compressor efficiency deteriorates.

Accordingly, it is required to reduce a leak of a compressed gas through an outer diameter clearance between adjacent working chambers in a discharge-side area in an axial direction of a compressor. A technology to reduce a leak of compressed gas in a discharge-side area through an outer diameter clearance is described in Patent Document 1, for example. In a screw compressor described in Patent Document 1, in order to reduce the ratio of a leak air volume to a suction air volume, and to prevent scuffing caused by contact between both screw rotors, a plurality of lobes provided to a female rotor are formed such that their lobe thicknesses are greater on the discharge-port side than that on the suction-port side. If the lobe thicknesses of the female rotor are increased on the discharge-port side (an end portion of the female rotor on a discharge side in an axial direction), the width (distance) of the boundary between adjacent working chambers on the discharge-port side of the female rotor increases by a corresponding degree. Because of this, it becomes possible to suppress a leak of a compressed gas through an outer diameter clearance between working chambers on the discharge-port side of the female rotor. Note that "lobe thicknesses" here mean the thicknesses of lobes in lobe profiles on cross-sections perpendicular to the axial direction of the screw rotors.

PRIOR ART DOCUMENT

Patent Document

Patent Document 1: JP-2004-144035-A

SUMMARY OF THE INVENTION

Problem to be Solved by the Invention

In addition, one of the techniques for enhancing performance of screw compressors is to make a compressor have multiple stages. In particular, there have increasingly been requests for an increase in discharge pressure in the field of air compressors in recent years, and it is conceivable that such requests are met by utilizing multiple-stage screw compressors. A multi-stage screw compressor boosts the pressure of a gas by causing a high-pressure-stage compressor to suck in and further compress the gas compressed by a low-pressure-stage compressor, and can compress a gas more highly efficiently than a single-stage screw compressor can. In a multi-stage screw compressor, there are pressure ratios in respective stages that minimize the overall drive power of the compressor under ideal conditions where there is no pressure loss, and additionally intake air temperatures of the respective stages are the same. If the pressure ratios in the respective stages are set in this manner, the differential pressure between the discharge pressure and suction pressure (hereinafter, referred to as an operation differential pressure in the respective stages in some cases) of a high-pressure-stage compressor becomes greater than the operation differential pressure of a low-pressure-stage compressor.

As mentioned before, if the operation differential pressure of a compressor of each stage increases, a leak of a compressed gas through an outer diameter clearance between adjacent working chambers on the discharge-port side (in an end portion of a screw rotor on a discharge side in the axial direction) increases by a corresponding degree. In particular, the operation differential pressure of a high-pressure-stage compressor is greater than the operation differential pressure of a low-pressure-stage compressor, and there is a concern that a leak of a compressed gas between working chambers through an outer diameter clearance causes deterioration of the efficiency.

The present invention has been made in order to solve the problems described above, and an object of the present invention is to provide a multi-stage screw compressor that can suppress efficiency deterioration caused by a leak of a compressed gas between working chambers through a clearance (outer diameter clearance) between a lobe tip of a screw rotor and the inner circumferential face of a casing.

Means for Solving the Problem

The present application provides solutions for solving the problems described above. An example thereof is a multi-stage screw compressor including a plurality of stages of compressor bodies that compress a gas in sequence. Each stage of the plurality of stages of compressor bodies has a pair of screw rotors that are housed revolvably in a casing in a mutually meshing state. The pair of screw rotors each include a rotor lobe section having a suction-side end face and a discharge-side end face at one end and another end thereof in an axial direction and having a twisted lobe extending from the suction-side end face to the discharge-side end face. The pair of screw rotors in a compressor body of at least one certain stage, excluding a compressor body of a first stage positioned at an upstream end, among the plurality of stages of compressor bodies are each configured such that lead increases from a suction side in the axial direction of the rotor lobe section toward a discharge side. The lead represents a length of advance in the axial direction under an assumption that twist of the lobe of the rotor lobe section is made one turn.

Advantages of the Invention

According to the present invention, by making the lead of the pair of screw rotors in the compressor body of the at least one certain stage excluding the compressor body of the first stage increase from the suction side in the axial direction toward the discharge side, the lobe tip thickness of the rotor lobe section (the thicknesses of the lobe tips on cross-section perpendicular to the extension direction of the lobe tips) increase on the discharge side, and the lengths of seal lines extending in the twisting directions of the lobe tips of the rotor lobe sections decrease. Thereby, it is possible to suppress efficiency deterioration caused by a leak of a compressed gas between working chambers through a clearance (outer diameter clearance) between the lobe tips of the pair of screw rotors and the inner circumferential face of the casing.

Problems, configuration, and advantages other than those described above are made clear by the following explanation of embodiments.

MODES FOR CARRYING OUT THE INVENTION

Embodiments of multi-stage screw compressors according to the present invention are explained below by illustrating examples by using the figures.

First Embodiment

Figure 1:
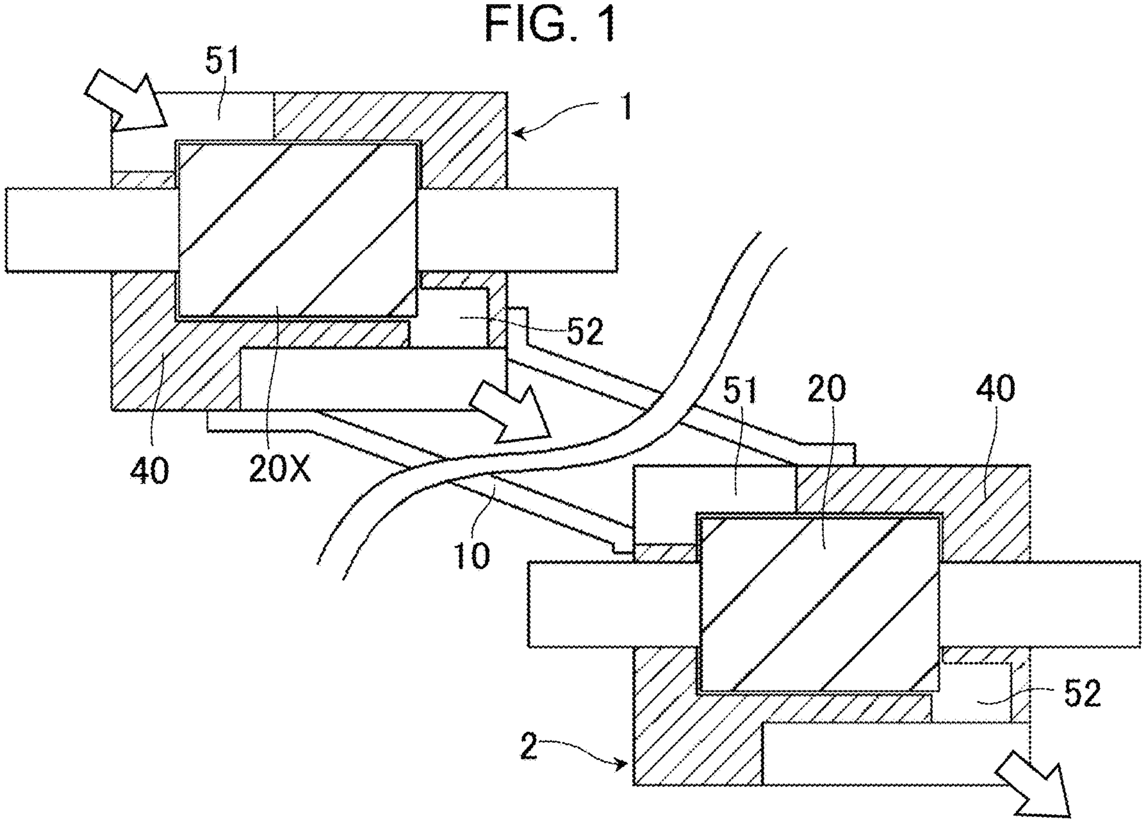
FIG. 1 is a cross-sectional view schematically depicting a two-stage screw compressor as a first embodiment of the present invention.

The configuration of a two-stage screw compressor according to a first embodiment is explained by using FIG. 1. FIG. 1 is a cross-sectional view schematically depicting the two-stage screw compressor as the first embodiment of the present invention.

In FIG. 1, the present embodiment is an example in which the multi-stage screw compressor of the present invention is applied to a two-stage screw compressor. The two-stage screw compressor includes an upstream-stage compressor body 1 that compresses a sucked gas and discharges the compressed gas, and a downstream-stage compressor body 2 on the high-pressure-stage side that further compresses the compressed gas discharged from the upstream-stage compressor body 1 and discharges the further compressed gas. The upstream-stage compressor body 1 is a compressor body of the first stage positioned at the upstream end among a plurality of stages of compressor bodies that compress a gas in sequence. The downstream-stage compressor body 2 is a compressor body of the last stage positioned at the downstream end among the plurality of stages of compressor bodies. The discharge side of the upstream-stage compressor body 1 and the suction side of the downstream-stage compressor body 2 are connected with each other via a connecting flow path 10. Note that the two-stage screw compressor can have configuration in which the connecting flow path 10 is provided with cooling means such as an intercooler (not depicted). By causing the cooling means to cool a compressed gas discharged from the upstream-stage compressor body 1, and then causing the downstream-stage compressor body 2 to compress the cooled compressed gas, the compression efficiency of the downstream-stage compressor body 2 is improved.

Figure 2:
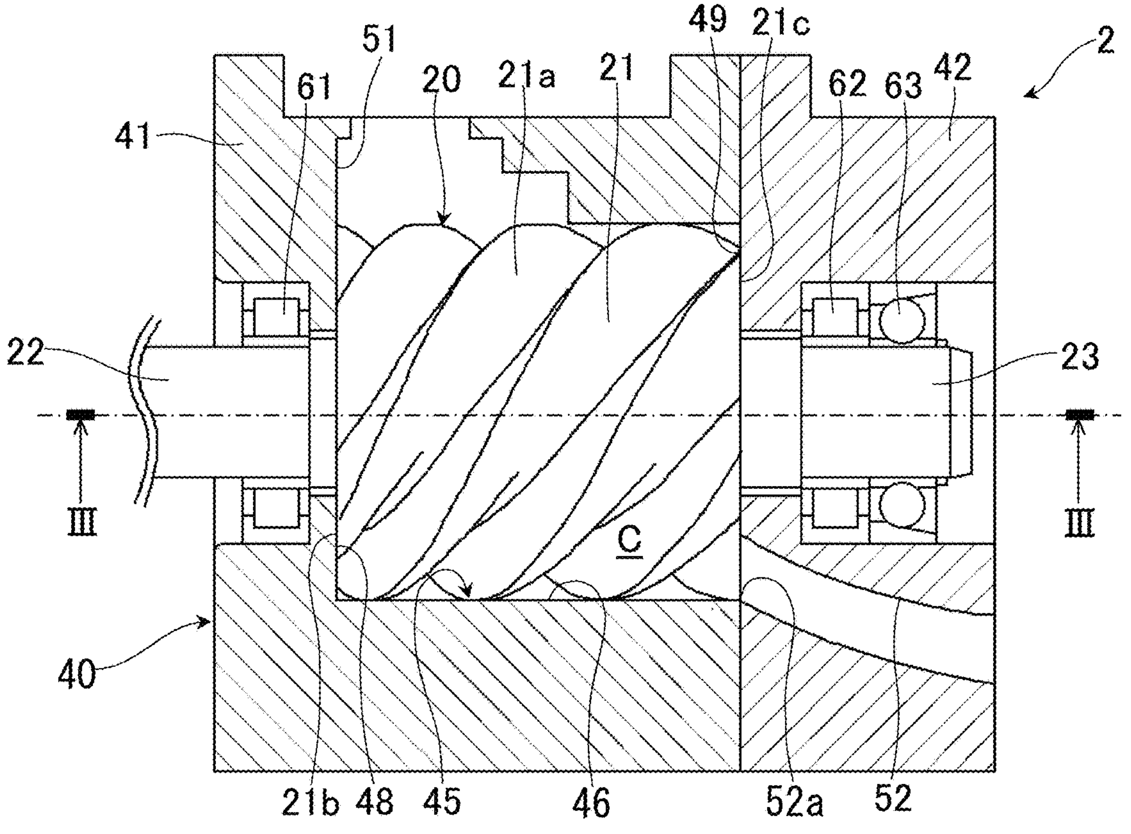
FIG. 2 is a longitudinal cross-sectional view depicting the structure of a downstream-stage compressor body included as a part of the two-stage screw compressor according to the first embodiment of the present invention depicted in FIG. 1.
Figure 3:
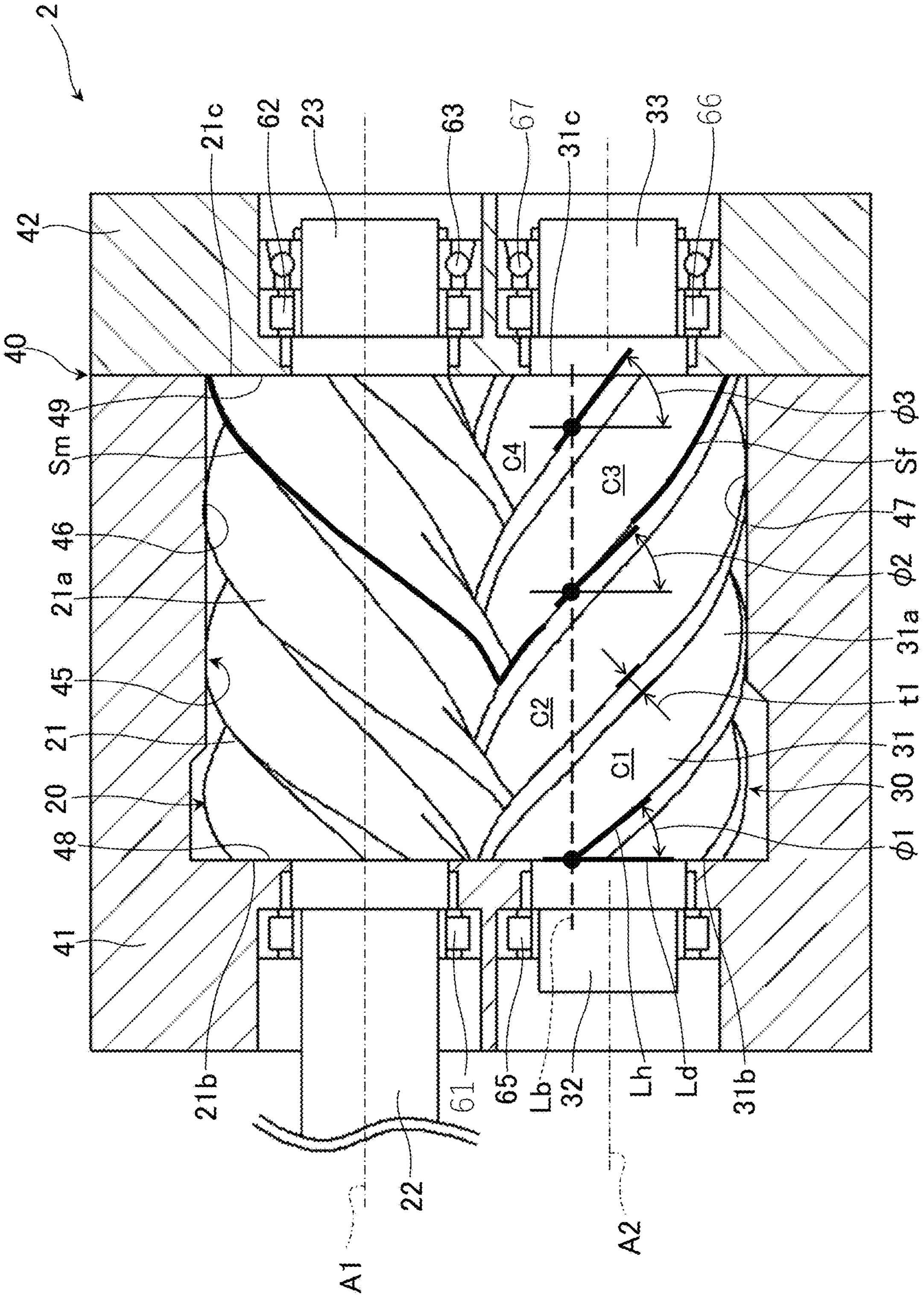
FIG. 3 is a cross-sectional view, taken along a plane III-III, of the downstream-stage compressor body of the two-stage screw compressor according to the first embodiment of the present invention depicted in FIG. 2.

Next, a common configuration and structure of the upstream-stage compressor body and downstream-stage compressor body in the two-stage screw compressor according to the first embodiment are explained by using FIG. 2 and FIG. 3. FIG. 2 is a longitudinal cross-sectional view depicting the structure of the downstream-stage compressor body included as a part of the two-stage screw compressor according to the first embodiment of the present invention depicted in FIG. 1. FIG. 3 is a cross-sectional view, taken along a plane III-III of FIG. 2, of the downstream-stage compressor body of the two-stage screw compressor according to the first embodiment of the present invention depicted in FIG. 2. Here, the configuration and structure of the downstream-stage compressor body are explained, and accordingly explanations of the configuration and structure of the upstream-stage compressor similar to those of the downstream-stage compressor body are omitted. In FIG. 2 and FIG. 3, the left side is a suction side in an axial direction of the screw compressor, and the right side is a discharge side in the axial-direction of the screw compressor.

In FIG. 2 and FIG. 3, the downstream-stage compressor body 2 includes: a male rotor 20 and a female rotor 30 as a pair of screw rotors that revolve while meshing with each other; and a casing 40 that houses the male rotor 20 and the female rotor 30 revolvably in a meshing state. The male rotor 20 and the female rotor 30 are arranged such that revolution centers A1 and A2 are parallel to each other. Both sides of the male rotor 20 in the axial direction (the left-right direction in FIG. 2 and FIG. 3) are revolvably supported by a suction-side bearing 61 and discharge-side bearings 62 and 63. Both sides of the female rotor 30 in the axial direction are revolvably supported by a suction-side bearing 65 and discharge-side bearings 66 and 67.

The male rotor 20 includes: a rotor lobe section 21 having helical twisted male lobes 21*a* (lobes); and a suction-side shaft section 22 and a discharge-side shaft section 23 provided at end portions of the rotor lobe section 21 on both sides in the axial direction. The rotor lobe section 21 has a suction-side end face 21*b* and a discharge-side end face 21*c*, perpendicular to the axial direction (the revolution center A1), on one end (the left end in FIG. 2 and FIG. 3) and the other end (the right end in FIG. 2 and FIG. 3) in the axial direction. On the rotor lobe section 21, the male lobes 21*a* extend from the suction-side end face 21*b* to the discharge-side end face 21*c*, and grooves are formed between the male lobes 21*a*. The suction-side shaft section 22 extends out of the casing 40, and is connected to a revolution drive source (not shown), for example. The male rotor 20 has a feature in the manner of twisting of the male lobes 21*a*. Details of the feature of the male rotor 20 are mentioned later.

The female rotor 30 includes: a rotor lobe section 31 having helical twisted female lobes 31*a*; and a suction-side shaft section 32 and a discharge-side shaft section 33 each provided at end portions of the rotor lobe section 31 on both sides in the axial direction. The rotor lobe section 31 has a suction-side end face 31*b* and a discharge-side end face 31*c*, perpendicular to the axial direction (the revolution center A2), on one end (the left end in FIG. 3) and the other end (the right end in FIG. 3) in the axial direction. On the rotor lobe section 31, the female lobes 31*a* extend from the suction-side end face 31*b* to the discharge-side end face 31*c*, and grooves are formed between the female lobes 31*a*. The female rotor 30 that meshes with the male rotor 20 also has a feature in the manner of twisting of the female lobes 31*a*. Details of the feature of the male rotor 20 are also mentioned later along with the feature of the male rotor 20.

The casing 40 includes a main casing 41, and a discharge-side casing 42 attached to the discharge side (the right side in FIG. 2 and FIG. 3) of the main casing 41. A bore 45 as a housing chamber that houses the rotor lobe section 21 of the male rotor 20 and the rotor lobe section 31 of the female rotor 30 in a mutually meshing state is formed inside the casing 40. The bore 45 is formed by closing, with the discharge-side casing 42, an opening on one side (the right side in FIG. 2 and FIG. 3) in the axial direction of two partially-overlapping cylindrical spaces formed in the main casing 41. The inner wall face defining the bore 45 includes: an approximately cylindrical first inner circumferential face 46 covering the radially outer side of the rotor lobe section 21 of the male rotor 20; an approximately cylindrical second inner circumferential face 47 covering the radially outer side of the rotor lobe section 31 of the female rotor 30; a suction-side inner wall face 48, on one side (the left side in FIG. 2 and FIG. 3) in the axial direction, that faces the suction-side end faces 21*b* and 31*b* of the rotor lobe sections 21 and 31 of the male and female rotors 20 and 30; and a discharge-side inner wall face 49, on the other side (the right side in FIG. 2 and FIG. 3) in the axial direction, that faces the discharge-side end faces 21*c* and 31*c* of the rotor lobe sections 21 and 31 of the male and female rotors 20 and 30. The rotor lobe sections 21 and 31 of the male and female rotors 20 and 30, and the inner wall face of the casing 40 surrounding the rotor lobe sections 21 and 31 (the first inner circumferential face 46, second inner circumferential face 47, suction-side inner wall face 48 and discharge-side inner wall face 49 of the bore 45) form a plurality of working chambers C1, C2, C3 and C4.

The suction-side bearing 61 on the side of the male rotor 20 and the suction-side bearing 65 on the side of the female rotor 30 are disposed in a suction-side end portion of the main casing 41. The discharge-side bearings 62 and 63 on the side of the male rotor 20 and the discharge-side bearings 66 and 67 on the side of the female rotor 30 are disposed in the discharge-side casing 42.

As depicted in FIG. 1 and FIG. 2, the casing 40 is provided with a suction flow path 51 for sucking in a gas to the working chambers C. The suction flow path 51 is for establishing communication between the outside of the casing 40 and the bore 45 (the working chambers). In addition, the casing 40 is provided with a discharge flow path 52 for discharging a compressed gas from the working chambers to the outside of the casing 40. The discharge flow path 52 is for establishing communication between the bore 45 (the working chambers) and the outside of the casing 40. The discharge flow path 52 has a discharge port 52*a* formed on the discharge-side inner wall face 49 of the casing 40.

The upstream-stage compressor body 1 depicted in FIG. 1 has configuration and a structure that are similar to those of the downstream-stage compressor body 2 depicted in FIG. 2 and FIG. 3. Note that the manners of twisting of male lobes of a male rotor 20X and female lobes of a female rotor (not depicted) in the upstream-stage compressor body 1 are different from the manners of twisting of the male lobes 21*a* of the male rotor 20 and the female lobes 31*a* of the female rotor 30 in the downstream-stage compressor body 2. Regarding portions where there are structural differences between the downstream-stage compressor body 2 and the upstream-stage compressor body 1, distinctions are made by giving a reference character X to corresponding portions on the side of the upstream-stage compressor body 1.

In the thus-formed two-stage screw compressor, when the male rotors 20X and 20 of the upstream-stage compressor body 1 and downstream-stage compressor body 2 depicted in FIG. 1 are driven by drive sources which are not depicted, the female rotors 30 (see FIG. 3) meshing with the male rotors 20 and 20X also revolve together. This causes the volumes of the working chambers to increase along with the revolutions of the male and female rotors 20, 20X, and 30, thereby a gas is sucked in from the outside through the suction flow paths 51, and the volumes of the working chambers C1, C2, C3, and C4 decrease successively in this order to compress the gas. The upstream-stage compressor body 1 compresses the gas sucked in through the suction flow path 51 to a predetermined intermediate pressure, and finally discharges the gas to the connecting flow path 10 through the discharge flow path 52. The downstream-stage compressor body 2 sucks in via the suction flow path 51 the compressed gas discharged from the upstream-stage compressor body 1 to the connecting flow path 10, and further compresses the compressed gas to boost the pressure of the gas to a predetermined pressure. In this manner, the two-stage screw compressor boosts the pressure of the gas to a predetermined discharge pressure by compressing the gas stepwise at the two stages of the upstream-stage compressor body 1 and the downstream-stage compressor body 2.

Meanwhile, regarding a multi-stage screw compressor including a two-stage screw compressor, there are pressure ratios in respective stages that can minimize power to drive the compressor. It has been known that supposing such ideal compression processes that loss of a compressor body of each stage and pressure loss in the connecting flow path 10 are negligible, and additionally the suction temperature of the downstream-stage compressor body 2 becomes the same as the suction temperature of the upstream-stage compressor body 1 due to cooling of a compressed gas flowing through the connecting flow path 10, pressure ratios in compressor bodies of respective stages that minimize the overall power of the multi-stage screw compressor can be determined in accordance with Formula (1).

[Formula 1]

$$\frac{P_{r+1}}{P_r} = \left(\frac{P_d}{P_S}\right)^{\frac{1}{N}},\ r = 1, 2, \ldots, N \qquad \text{Formula (1)}$$

Here, r represents each stage of the multi-stage screw compressor, and N represents the total number of stages of the multi-stage screw compressor. In addition, $P_s$ represents a suction pressure, and $P_d$ represents a discharge pressure.

An air compressor or a compressor for refrigeration and air conditioning for use as a two-stage screw compressor is rarely used under operation conditions where the suction pressure and the discharge pressure are always maintained at constant pressures, and it is necessary for the compressor to cope with operation in various pressure states. In the field of air compressors, there have increasingly been requests for an increase in discharge pressure in recent years. Table 1 summarizes, based on Formula (1) using a discharge pressure as a parameter, operation pressure ratios and operation differential pressures in the upstream-stage compressor body 1 as the low-pressure stage and the downstream-stage compressor body 2 as the high-pressure stage in the two-stage screw compressor. Note that in Table 1, Pi represents a pressure in the connecting flow path 10.

TABLE 1

| | Difference between | Downstream-stage compressor | | Upstream-stage compressor | |
|---|---|---|---|---|---|
| Discharge pressure Pd (MPa) | operation differential pressures MPa [B − A] | Pressure ratio Pd/Pi | Operation differential pressure B MPa [=Pd − Pi] | Pressure ratio Pi/Ps | Operation differential pressure A MPa [=Pi − Ps] |
| 0.8 | 0.334 | 2.83 | 0.517 | 2.83 | 0.183 |
| 1.0 | 0.468 | 3.16 | 0.684 | 3.16 | 0.216 |
| 1.2 | 0.608 | 3.46 | 0.854 | 3.46 | 0.246 |

It is apparent from Formula (1) that the pressure ratios of the upstream-stage compressor body 1 and downstream-stage compressor body 2 that minimize the power of the two-stage screw compressor (see the third column and fifth column from left in Table 1) become the same despite changes in discharge pressure Pd as a parameter (see the first column from left in Table 1). In contrast, the operation differential pressure of the upstream-stage compressor body 1 (see the sixth column from left in Table 1) and the operation differential pressure of the downstream-stage compressor body 2 (see the fourth column from left in Table 1) increase as the discharge pressure Pd rises. In addition, the difference of the operation differential pressure of the downstream-stage compressor body 2 from the operation differential pressure of the upstream-stage compressor body 1 (see the second column from left in Table 1) also increases as the discharge pressure Pd rises. The difference of the operation differential pressure of the downstream-stage compressor body 2 from the operation differential pressure of the upstream-stage compressor body 1 at a time when the discharge pressure of the two-stage screw compressor is 1.2 MPa is approximately 1.8 times greater than the difference between the operation differential pressures at a time when the discharge pressure is 0.8 MPa. Because of this, a leak of a compressed gas, on the discharge side in the axial direction, between adjacent working chambers through a clearance (outer diameter clearance) between the first inner circumferential face 46 and second inner circumferential face 47 of the casing 40 and the lobe tips of the male and female rotors 20 and 30 in the downstream-stage compressor body 2 becomes greater than that in a case of the upstream-stage compressor body 1. In view of this, in the downstream-stage compressor body 2 of the two-stage screw compressor according to the present embodiment, the manners of twisting of the male lobes 21*a* of the male rotor 20 and the female lobes 31*a* of the female rotor 30 that mesh with each other are changed to suppress a leak of a compressed gas between adjacent working chambers through an outer diameter clearance.

Figure 4:
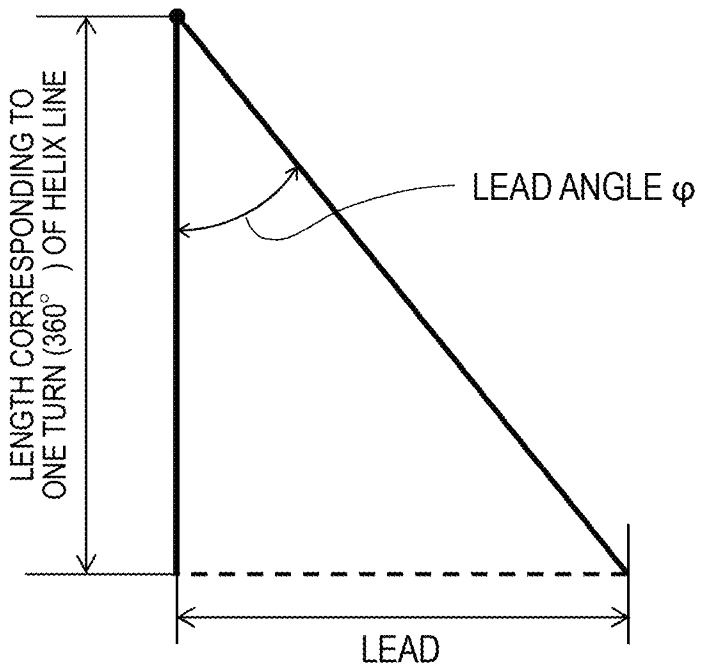
FIG. 4 is an explanatory diagram depicting the relation between the lead angle and lead of a screw rotor.

Next, features of twisting of the male rotor and the female rotor (the pair of screw rotors) in the downstream-stage compressor body in the two-stage screw compressor according to the first embodiment are explained by using FIG. 3 and FIG. 4. Note that only a feature of twisting of the female lobes 31*a* of the female rotor 30 is explained here, and explanations of a feature of twisting of the male lobes 21*a* of the male rotor 20 are omitted. Since the male and female rotors 20 and 30 revolve in a meshing state, the manners of twisting of the male lobes 21*a* of the male rotor 20 and the female lobes 31*a* of the female rotor 30 become similar to each other. Hereinbelow, a lobe tip which is a set of lobe tip points of the rotor lobe section 31 of the female rotor 30 is referred to as a helix line. In addition, regarding the helix line of the female rotor 30, the side closer to the discharge-side end face 31*c* is referred to as a leading side, and the side closer to the suction-side end face 31*b* is referred to as a trailing side.

The female rotor 30 in the downstream-stage compressor body 2 according to the present embodiment depicted in FIG. 3 is configured such that its lead angle increases gradually from the suction-side end face 31*b* of the rotor lobe section 31 toward the discharge-side end face 31*c*. The lead angle of the female rotor 30 (rotor lobe section 31) represents the inclination of the helix line at each lobe tip point of the female rotor 30, and refers to an angle formed between the helix line and a plane that passes through one point (lobe tip point) on the helix line of the rotor lobe section 31 and is orthogonal to the axial direction (revolution center A2) of the rotor lobe section 31. That is, it is an angle between an inclination line Lh of the helix line (the tangent line to the helix line at each lobe tip point) of the female rotor 30 and a reference line Ld parallel to the suction-side end face 31*b* of the female rotor 30. Lead angles at a lobe tip point on the suction-side end face 31*b* of the female rotor 30 and lobe tip points on the leading side that are positioned on a certain base line Lb parallel to the revolution center A2 of the female rotor 30 are depicted in FIG. 3. The inclination of the inclination line Lh of the helix line to the respective reference lines Ld at respective lobe tip points (lead angle) increases as the inclination lies closer to the discharge-side end face 31*c* (ϕ1<ϕ2<ϕ3). The lead angle on the helix line on the trailing side (not depicted in FIG. 3) also increases similarly toward the discharge-side end face 31*c*.

In this explanation, lead is defined as a length of axial advance under the assumption that the helix line of the female rotor 30 is made one turn. The relation between the lead angle and the lead is depicted in FIG. 4. FIG. 4 is an explanatory diagram depicting the relation between the lead angle and lead in a screw rotor. As is apparent from the relation depicted in FIG. 4, it can be stated differently that the female rotor 30 of the downstream-stage compressor body 2 mentioned above is configured such that its lead increases from the suction side toward the discharge side in the axial direction. The female rotor 30 is configured such that its lead varies gradually over the entire length from the suction-side end face 31*b* to the discharge-side end face 31*c* of the rotor lobe section 31.

The female rotor 30 whose lead (lead angle) increases from the suction side toward the discharge side in the axial direction has a structure in which the degree of twisting of the female lobes 31*a* lessens from the suction side toward the discharge side. In this case, under a condition that the lobe profile of the female rotor 30 on a cross-section perpendicular to the axial direction (revolution center A2) is approximately constant at any position in the axial direction, a lobe tip thickness t1 of the female rotor 30 in a cross-section perpendicular to an extension direction of the helix line increases along with the size of the lead (lead angle) from the suction side toward the discharge side. In addition, the length of a seal line Sf extending in the twisting direction of the helix line of the female rotor 30 is shorter than that in a case of a female rotor with invariable lead (invariable lead angle) at the same revolution position.

In addition, since the male rotor 20 in the downstream-stage compressor body 2 also is configured to mesh with the female rotor 30 of the downstream-stage compressor body 2, the male rotor 20 is configured such that its lead angle increases gradually from the suction-side end face 21*b* toward the discharge-side end face 21*c* of the rotor lobe section 21. That is, the male rotor 20 also is configured such that its lead increases from the suction side toward the discharge side in the axial direction. The male rotor 20 is configured such that its lead varies gradually over the entire length from the suction-side end face 21*b* to the discharge-side end face 21*c* of the rotor lobe section 21. Accordingly, the male rotor 20 also has a structure in which the degree of twisting of the male lobes 21*a* lessens from the suction side toward the discharge side. In this case, the length of a seal line Sm extending in the twisting direction of the helix line of the male rotor 20 is shorter than that in a case of a male rotor with invariable lead (invariable lead angle) at the same revolution position.

Note that the male rotor 20X and female rotor of the upstream-stage compressor body 1 are invariable-lead screw rotors unlike the male rotor 20 and female rotor 30 of the downstream-stage compressor body 2. That is, the male rotor 20X and female rotor in the upstream-stage compressor body 1 are configured such that their lead angles are the same at any axial position from the suction-side end faces to the discharge-side end faces of the rotor lobe sections.

Figure 5:
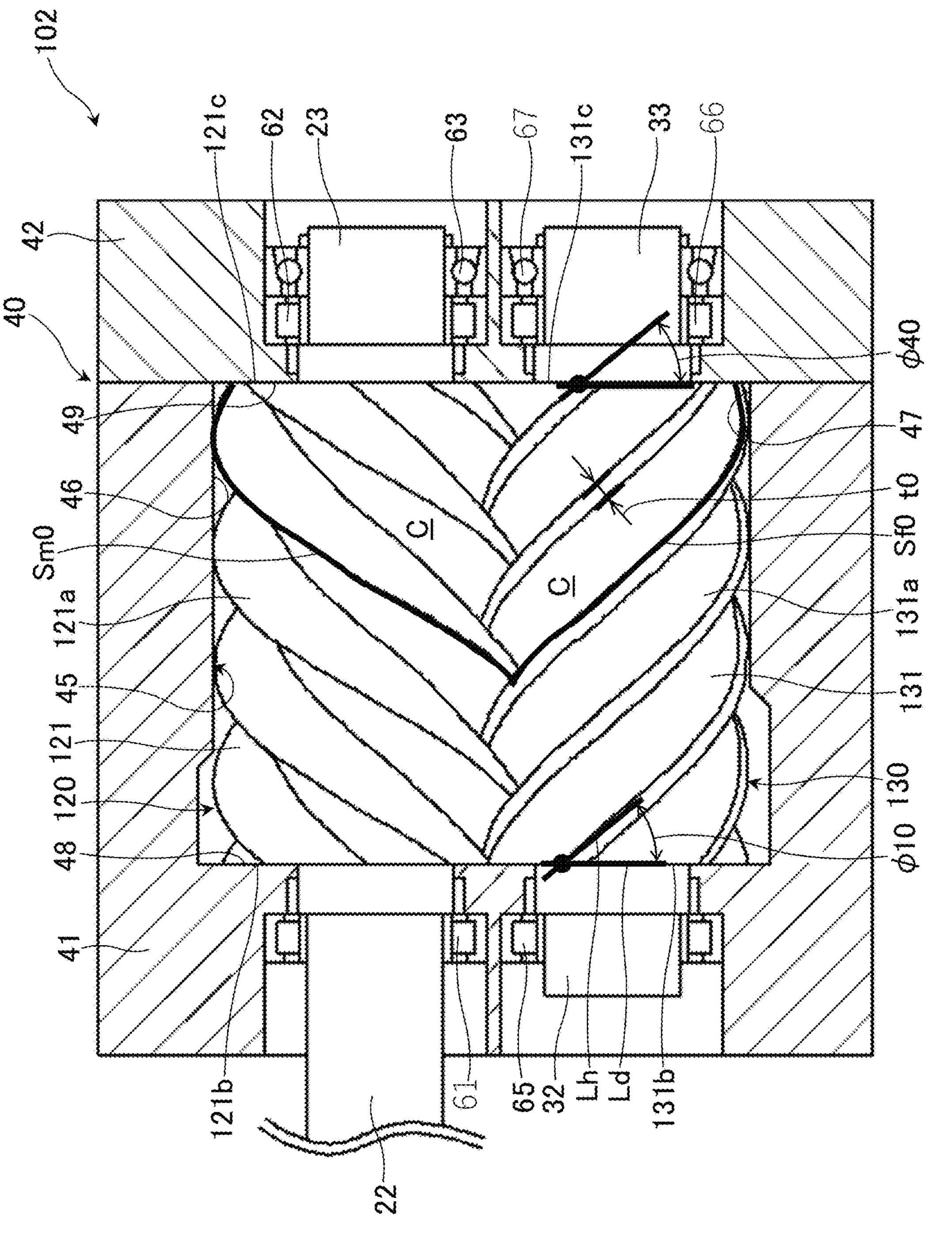
FIG. 5 is a cross-sectional view depicting the structure of a screw compressor as a comparative example to be compared with the downstream-stage compressor body of the two-stage screw compressor according to the first embodiment of the present invention.
Figure 6:
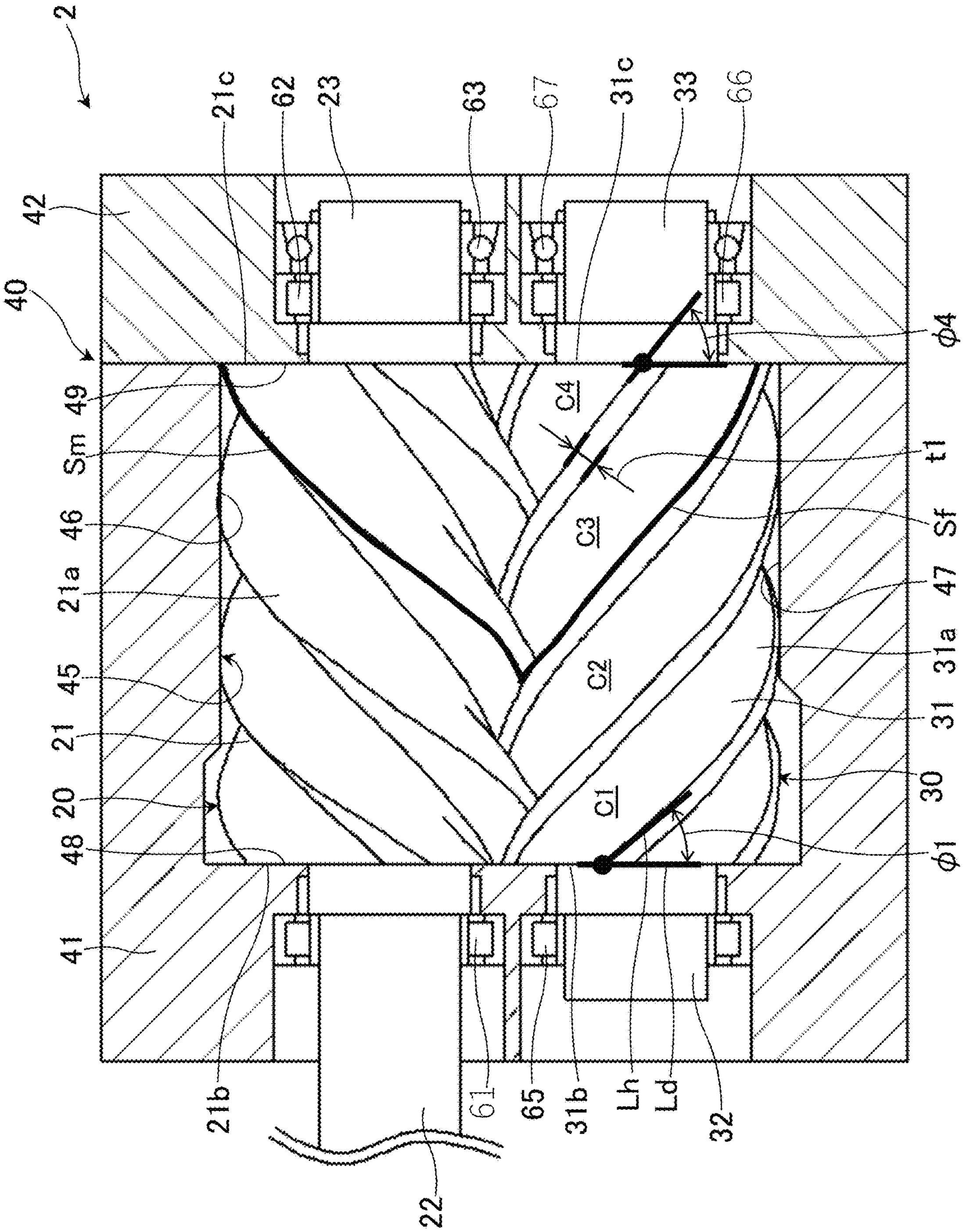
FIG. 6 is a figure for explaining advantages of a structural feature of the downstream-stage compressor body of the two-stage screw compressor according to the first embodiment of the present invention.
Figure 7:
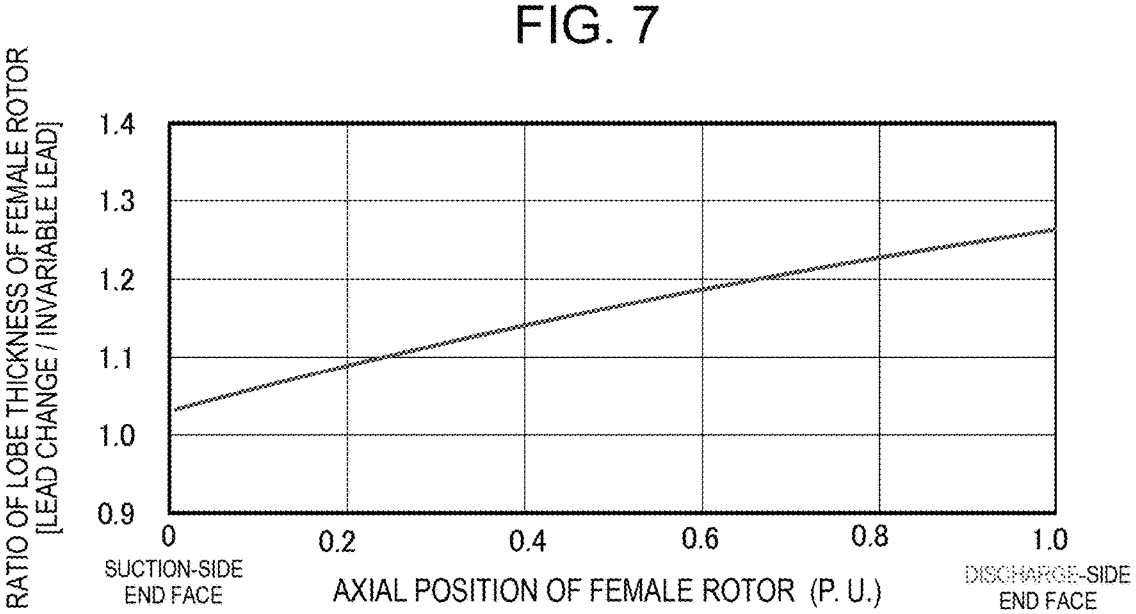
FIG. 7 is a characteristics diagram depicting the relation of the lobe thickness of a female rotor of the downstream-stage compressor body of the two-stage screw compressor according to the first embodiment of the present invention with respect to the comparative example.
Figure 8:
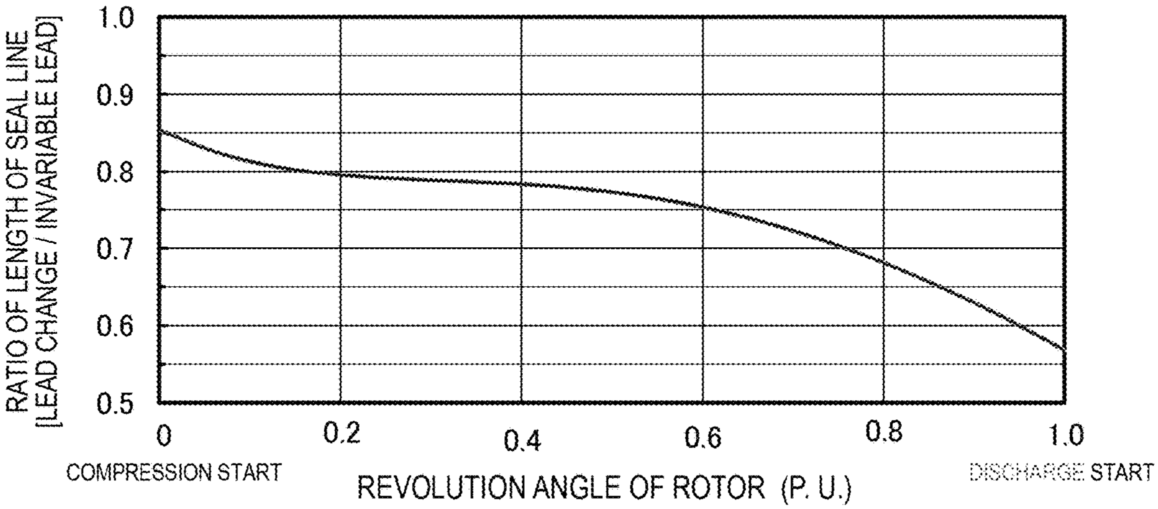
FIG. 8 is a characteristics diagram depicting the relation of the length of a lobe-tip seal line of the female rotor of the downstream-stage compressor body of the two-stage screw compressor according to the first embodiment of the present invention with respect to the comparative example.
Figure 9:
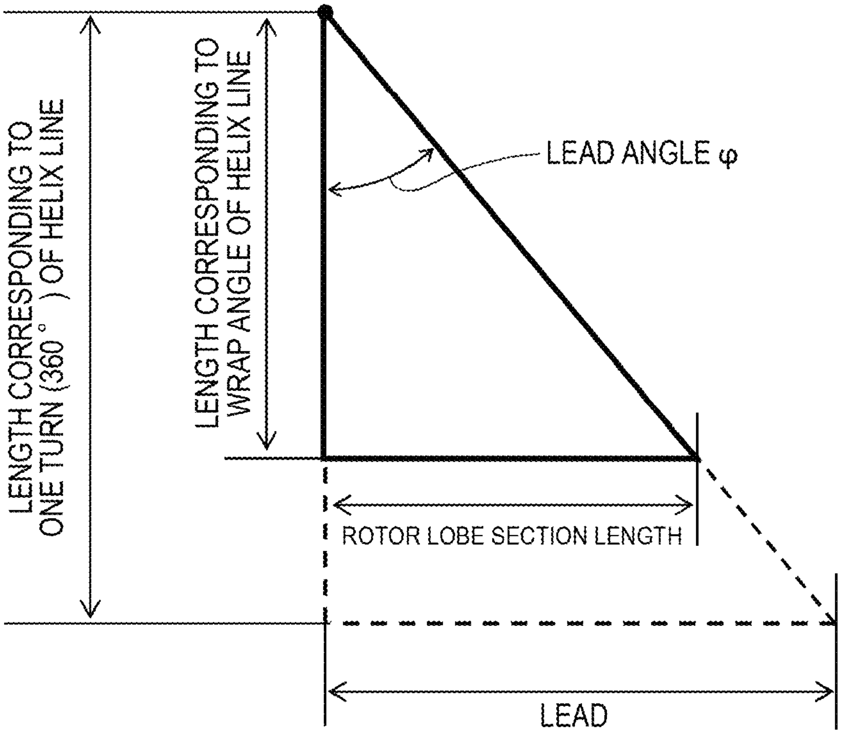
FIG. 9 is an explanatory diagram depicting the relation among the lead angle, lead, rotor lobe section length, and wrap angle in a screw rotor.
Figure 10:
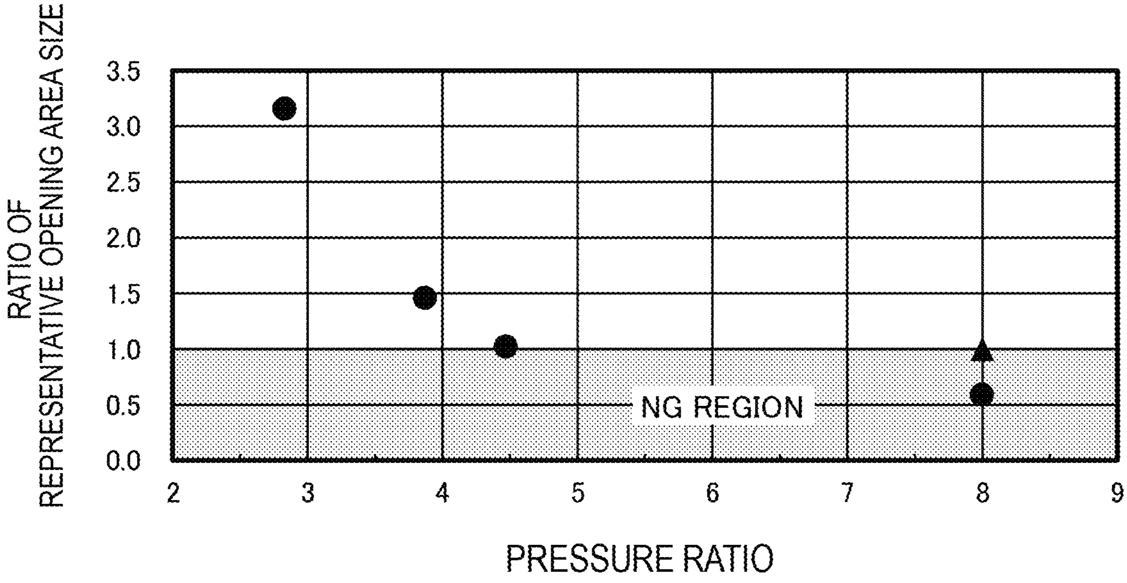
FIG. 10 is a characteristics diagram depicting the relation between the stage pressure ratio and discharge opening area size in the downstream-stage compressor body of the two-stage screw compressor according to the first embodiment of the present invention.

Next, advantages of the two-stage screw compressor according to the first embodiment are explained by using FIG. 5 to FIG. 10 while comparing it with a screw compressor according to a comparative example. FIG. 5 is a cross-sectional view depicting the structure of the screw compressor as the comparative example to be compared with the downstream-stage compressor body of the two-stage screw compressor according to the first embodiment of the present invention. FIG. 6 is a figure for explaining advantages of a structural feature of the downstream-stage compressor body of the two-stage screw compressor according to the first embodiment of the present invention. FIG. 7 is a characteristics diagram depicting the relation of the lobe thickness of the female rotor of the downstream-stage compressor body of the two-stage screw compressor according to the first embodiment of the present invention with respect to the comparative example. FIG. 8 is a characteristics diagram depicting the relation of the length of a lobe-tip seal line of the female rotor of the downstream-stage compressor body of the two-stage screw compressor according to the first embodiment of the present invention with respect to the comparative example. FIG. 9 is an explanatory diagram depicting the relation among the lead angle, lead, rotor lobe section length, and wrap angle in a screw rotor. FIG. 10 is a characteristics diagram depicting the relation between the stage pressure ratio and discharge opening area size in the downstream-stage compressor body of the two-stage screw compressor according to the first embodiment of the present invention. Note that portions in FIG. 5 that are given reference characters which are the same as the reference characters of portions depicted in FIG. 1 to FIG. 4 have structures similar to those portions, and explanations of the portions with the same reference characters are omitted.

A screw compressor 102 according to the comparative example depicted in FIG. 5 includes an invariable-lead male rotor 120 and an invariable-lead female rotor 130 whose leads do not vary in the axial direction from the suction side to the discharge side. That is, the leads and lead angles of the male rotor 120 and female rotor 130 are constant from suction-side end faces 121*b* and 131*b* to discharge-side end faces 121*c* and 131*c* of rotor lobe sections 121 and 131. For example, as depicted in FIG. 5, a lead angle ϕ10 at a lobe tip point on the suction-side end face 131*b* and a lead angle ϕ40 at a lobe tip point on the discharge-side end face 131*c* of the female rotor 130 are the same angle. The manner of twisting of female lobes 131*a* of the invariable-lead female rotor 130 is constant from the suction side toward the discharge side. In this case, a lobe tip thickness t0 of the female rotor 130 on a cross-section perpendicular to the extension direction of the helix line also is the same from the suction side to the discharge side. The configuration and structure of the screw compressor 102 according to the comparative example in other respects are similar to those of the downstream-stage compressor body 2 according to the present embodiment.

In contrast, the downstream-stage compressor body 2 according to the present embodiment includes the male rotor 20 and female rotor 30 whose leads increase in the axial direction from the suction side toward the discharge side. For example, as depicted in FIG. 6, a lead angle ϕ4 at a lobe tip point on the discharge-side end face 31*c* of the female rotor 30 is greater than a lead angle ϕ1 at a lobe tip point on the suction-side end face 31*b* of the female rotor 30.

Here, a case is considered in which the lead angle ϕ1 at the lobe tip point on the suction-side end face 31*b* of the female rotor 30 in the downstream-stage compressor body 2 according to the present embodiment is set to the same angle as the lead angle ϕ10 at the lobe tip point on the suction-side end face 131*b* of the female rotor 130 in the screw compressor 102 according to the comparative example.

In this case, the relation of the lobe tip thickness t1 of the female rotor 30 according to the present embodiment to the lobe tip thickness t0 of the female rotor 130 in the screw compressor 102 according to the comparative example is depicted in FIG. 7. In FIG. 7, the horizontal axis represents axial positions in the rotor lobe section 31 of the female rotor 30. Note that these axial positions are relative positions in a case where the position of the suction-side end face 31*b* of the rotor lobe section 31 of the female rotor 30 is set as a start point 0, and the position of the discharge-side end face 31*c* is set as an end point 1. The vertical axis represents ratios of the lobe tip thickness t1 (the thickness on a cross-section perpendicular to the extension direction of the helix line) of the female rotor 30 according to the present embodiment to the lobe tip thickness t0 of the female rotor 130 according to the comparative example.

As depicted in FIG. 7, it can be known that the lobe tip thickness t1 of the female rotor 30 in the downstream-stage compressor body 2 according to the present embodiment relatively increases gradually from the suction side toward the discharge side relative to the lobe tip thickness t0 of the invariable-lead female rotor 130 according to the comparative example. The increase of the lobe tip thickness t1 means that the width (distance) of the boundary between adjacent working chambers of the female rotor 30 increases. That is, this means that the thickness (width) of a clearance (outer diameter clearance) formed between the second inner circumferential face 47 of the casing 40 (the inner wall face of the bore 45) and a lobe tip of the female rotor 30 increases, and the length of a leak flow path between adjacent working chambers increases. This causes the flow resistance of a compressed gas that goes through the outer diameter clearance between the adjacent working chambers to increase, and thus allows a leak of the compressed gas through the outer diameter clearance to be suppressed.

In addition, the relation of the length of the seal line Sm or Sf of the male rotor 20 or female rotor 30 according to the present embodiment to the length of a seal line Sm0 or Sf0 of the male rotor 120 or female rotor 130 in the screw compressor 102 according to the comparative example is depicted in FIG. 8. In FIG. 8, the horizontal axis represents revolution angular positions of the male rotor 20 or female rotor 30. Note that the positions of revolution angle are positions of relative angle in a case where a position of revolution angle at the start of a compression process is set as a start point 0, and a position of revolution angle at the start of a discharge process is set as an end point 1. The vertical axis represents ratios of the length of the seal line Sm or Sf of a lobe tip of the male rotor 20 or female rotor 30 according to the present embodiment to the length of the seal line Sm0 or Sf0 of a lobe tip of the male rotor 120 or female rotor 130 according to the comparative example.

As depicted in FIG. 8, it can be known that the lengths of the seal lines Sm and Sf of the lobe tips of the male rotor 20 and female rotor 30 in the downstream-stage compressor body 2 according to the present embodiment relatively decrease gradually from the suction side toward the discharge side relative to the lengths of the seal lines Sm0 and Sf0 of the lobe tips of the invariable-lead male rotor 120 and female rotor 130 according to the comparative example. The lengths of the seal lines Sm and Sf of the lobe tips of the male rotor 20 and female rotor 30 are equivalent to the lengths of the helix lines in the extension directions thereof at outer diameter clearances. That is, reductions of the lengths of the seal lines Sm and Sf of the lobe tips of the male rotor 20 and female rotor 30 mean reductions of the entire lengths of the outer diameter clearances as areas through which a compressed gas leaks. This allows a leak of the compressed gas that goes through the outer diameter clearances between adjacent working chambers to be suppressed.

In this manner, in the downstream-stage compressor body 2 according to the present embodiment, the lobe tip thickness t1 of the female rotor 30 is greater than the lobe tip thickness t0 of the invariable-lead female rotor 130 according to the comparative example, and also the lengths of the seal lines Sm and Sf of the lobe tips of the male rotor 20 and female rotor 30 are shorter than the lengths of the seal lines Sm0 and Sf0 of the lobe tips of the invariable-lead male rotor 120 and female rotor 130 according to the comparative example. Due to these two structural differences, it is possible to suppress a leak of a compressed gas that goes through an outer diameter clearance between adjacent working chambers.

In particular, as depicted in Table 1 mentioned before, the operation differential pressure in the downstream-stage compressor body 2 increases along with an increase in discharge pressure than that in the upstream-stage compressor body 1. Accordingly, by making the lead of the male and female rotors 20 and 30 in the downstream-stage compressor body 2 increase from the suction side toward the discharge side, it is possible to suppress a leak of a compressed gas between working chambers on the discharge side where the differential pressure increases, and thus it is possible to effectively reduce leak loss, and realize high efficiency of the entire two-stage screw compressor.

Note that the wrap angles of the invariable-lead screw rotors (the male rotor 120 and female rotor 130) of the screw compressor 102 as the comparative example are often set to angles in the range from 190° to 310°. The wrap angles represent revolution angles from the start points of the helices of male lobes 121*a* of the male rotor 120 and the female lobes 131*a* (lobes) of the female rotor 130 (the positions of the suction-side end faces 121*b* and 131*b*) to their end points (the positions of the discharge-side end faces 121*c* and 131*c*). The characteristics diagrams depicted in FIG. 7 and FIG. 8 mentioned above represent a case where the wrap angle of the female rotor 130 is set to an angle in the range from 190° to 310°.

In this case, the lead angles of the invariable-lead screw rotors (the male rotor 120 and female rotor 130) are determined in accordance with the following Formula (2) according to a set wrap angle. Here, rotor lobe section length represents the lengths of the male rotor 120 and female rotor 130 from the suction-side end faces 121*b* and 131*b* to the discharge-side end faces 121*c* and 131*c* of the rotor lobe sections 121 and 131. The relation among the lead angle, lead, rotor lobe section length, and wrap angle in a screw rotor is depicted in FIG. 9.

[Formula 2]

$$\text{Lead angle} = \tan^{-1}\left(\frac{\text{Rotor lobe section length}}{0.5 \times \text{Rotor outer diameter} \times \text{Wrap angle [rad]}}\right) = \tan^{-1}\left(\frac{\text{Lead}}{\text{Rotor outer diameter} \times \pi}\right) \quad \text{Formula (2)}$$

Meanwhile, regarding the downstream-stage compressor body 2 in which the leads of the male and female rotors 20 and 30 (screw rotors) increases from the suction side toward the discharge side, the area size of an opening of a working chamber in a discharge process with respect to the discharge port 52*a* (hereinafter, referred to as a discharge opening area size in some cases) decreases undesirably, as compared with that in the screw compressor having the male and female rotors 120 and 130 with invariable lead. Note that the discharge opening area size is not the opening area size of the discharge port 52*a* itself. Since the discharge opening area size increases and decreases along with changes in the revolution angles of the male and female rotors 20 and 30, an index called a representative opening area size is used for assessing whether the discharge opening area size is large or small. The representative opening area size is defined by the following Formula (3).

[Formula 3]

$$\text{Representative opening area size} = \text{Maximum value of Discharge opening area size} \times \frac{\text{Opening zone [rad]}}{2\pi} \quad \text{Formula (3)}$$

Here, the opening zone represents the ranges of revolution angles of the male and female rotors 20 and 30 in which a certain working chamber is in a discharge process. In addition, the maximum value of the discharge opening area size is the maximum value of the area of an opening of the working chamber in the discharge process with respect to the discharge port 52*a* in the opening zone.

A decrease in the representative opening area size causes an increase in the discharge resistance of a compressed gas by a corresponding degree, and thus the compression efficiency of the screw compressor deteriorates in some cases. In a case of pressure ratios of 8 or greater which are typically adopted for single-stage screw compressors, the negative influence of an increase in the discharge resistance of a compressed gas caused by a decrease in the representative opening area size undesirably outweighs the advantage in terms of suppression of a leak of the compressed gas between working chambers through an outer diameter clearance. Because of this, it is difficult to adopt a structure in which the lead increases from the suction side toward the discharge side as a structure of a single-stage screw compressor with a high-pressure ratio. In contrast, in a multi-stage screw compressor including a two-stage screw compressor, the pressure ratio of each stage is lower than that of a single-stage screw compressor, and thus it has a merit in terms of ensuring a suppression effect of a leak of a compressed gas between working chambers through an outer diameter clearance while mitigating the negative influence of an increase in the discharge resistance of the compressed gas caused by a decrease in the representative opening area size.

For example, the relation of changes in the representative opening area size to changes in the pressure ratio in the downstream-stage compressor body 2 according to the present embodiment is depicted in FIG. 10. In FIG. 10, the horizontal axis represents the pressure ratio in the downstream-stage compressor body 2. The vertical axis represents the ratio of the representative opening area size in the downstream-stage compressor body 2 according to the present embodiment to the representative opening area size of a single-stage screw compressor, with a pressure ratio of 8, including invariable-lead screw rotors. Note that the characteristics diagram depicted in FIG. 10 depicts results in a case where the lead at the suction-side end faces 21*b* and 31*b* of the male rotor 20 and female rotor 30 of the downstream-stage compressor body 2 is set to the same value as the lead of the invariable-lead screw rotors in the single-stage screw compressor as reference screw rotors, and also the ratio of the lead at the discharge-side end faces 21*c* and 31*c* to the lead at the suction-side end faces 21*b* and 31*b* is set to 1.5.

When the pressure ratio is set to 8, as depicted in FIG. 10, the representative opening area size in the downstream-stage compressor body 2 including the male rotor 20 and female rotor 30 whose lead increases from the suction side toward the discharge side becomes smaller than the representative opening area size as a reference (a mark A in FIG. 10) in the single-stage screw compressor with a pressure ratio of 8 including the invariable-lead screw rotors. Because of this, it is predicted that the discharge resistance increases due to the small representative opening area size. In contrast, when the pressure ratio is set to 4.5 or lower in the downstream-stage compressor body 2, it is possible to ensure that the representative opening area size in the downstream-stage compressor body 2 is equal to or greater than the representative opening area size in the single-stage screw compressor with a pressure ratio of 8 as a reference. Accordingly, by setting the pressure ratio to 4.5 or lower in the downstream-stage compressor body 2, it is possible to mitigate the influence of an increase in the discharge resistance depending on the size of the representative opening area, and also it is possible to attain the advantage in terms of suppression of a leak between working chambers due to an increase in the lobe tip thickness t0 of the female rotor 30 and reductions of the lengths of the seal lines Sm and Sf of the lobe tips of the male rotor 20 and the female rotor 30.

As mentioned above, the two-stage screw compressor (multi-stage screw compressor) according to the first embodiment includes the upstream-stage compressor body 1 and downstream-stage compressor body 2 (the plurality of stages of compressor bodies) that compress a gas in sequence, and each stage of the upstream-stage compressor body 1 and downstream-stage compressor body 2 (the plurality of stages of compressor bodies) has the male rotor 20 and female rotor 30 (the pair of screw rotors) that are housed revolvably in the casing 40 in a mutually meshing state. The male rotor 20 and female rotor 30 (the pair of screw rotors) each include the rotor lobe section 21 or 31 having: the suction-side end face 21*b* or 31*b* and the discharge-side end face 21*c* or 31*c* on its one end and on the other end in the axial direction; and also the twisted lobe 21*a* or 31*a* extending from the suction-side end face 21*b* or 31*b* to the discharge-side end face 21*c* or 31*c*. The male rotor 20 and female rotor 30 (the pair of screw rotors) in the downstream-stage compressor body 2 (the compressor body of the at least one certain stage), excluding the upstream-stage compressor body 1 positioned at the upstream end (the compressor body of the first stage), in the upstream-stage compressor body 1 and downstream-stage compressor body 2 (the plurality of stages of compressor bodies) are each configured such that the lead increases from the suction side in the axial direction of the rotor lobe section 21 or 31 toward the discharge side. The lead represents the length of advance in the axial direction under an assumption that twist of the lobe of the rotor lobe section is made one turn.

According to this configuration, by making the lead of the male rotor 20 and female rotor 30 (the pair of screw rotors) in the downstream-stage compressor body 2 (the compressor body of the at least one certain stage) excluding the upstream-stage compressor body 1 (the compressor body of the first stage) increase from the suction side in the axial direction toward the discharge side, the lobe tip thickness t1 of the rotor lobe sections 21 or 31 (the thickness of the lobe tips on cross-sections perpendicular to the extension directions of the lobe tips) increase on the discharge side, and also the lengths of the seal lines Sf and Sm extending in the twisting directions of the lobe tips of the rotor lobe sections 21 and 31 decrease. Thereby, it is possible to suppress efficiency deterioration caused by a leak of a compressed gas between working chambers through a clearance (outer diameter clearance) formed between the lobe tips of the male rotor 20 and female rotor 30 (the pair of screw rotors) and the first inner circumferential face 46 and second inner circumferential face 47 (the inner circumferential face) of the casing 40.

In addition, in the present embodiment, the male rotor 20 and female rotor 30 (the pair of screw rotors) in the downstream-stage compressor body 2 positioned at the downstream end (the compressor body of the last stage) are each configured such that their lead increases from the suction side in the axial direction of the rotor lobe sections 21 or 31 toward the discharge side. According to this configuration, screw rotors with lead varied are adopted for the male rotor 20 and female rotor 30 of the downstream-stage compressor body 2 whose operation differential pressure is greater, and it is thus possible to enhance suppression effect of a leak of a compressed gas between working chambers through an outer diameter clearance, and to effectively suppress deterioration of the compression efficiency.

In addition, in the two-stage screw compressor according to the present embodiment, the male rotor 20 and female rotor 30 (the pair of screw rotors) in the downstream-stage compressor body 2 (the compressor body of the at least one certain stage excluding the upstream-stage compressor body 1) are each configured such that their lead varies over the entire length in the axial direction of the rotor lobe section 21 or 31. According to this configuration, the lobe tip thickness t1 of the rotor lobe section 21 or 31 gradually increase in the axial direction from the suction-side end face 21*b* or 31*b* to the discharge-side end face 21*c* or 31*c*, and it is thus possible to further suppress a leak of a compressed gas between working chambers through an outer diameter clearance.

In addition, in the downstream-stage compressor body 2 according to the present embodiment (the compressor body of the at least one certain stage excluding the upstream-stage compressor body 1), the pressure ratio is equal to or lower than 4.5. According to this configuration, it is possible to improve the compressor efficiency due to suppression of a leak of a compressed gas between working chambers through an outer diameter clearance while suppressing an increase in the discharge resistance due to a decrease in the discharge opening area size that accompanies lead change in the male rotor 20 and female rotor 30 (the pair of screw rotors).

In addition, in the two-stage screw compressor according to the present embodiment, the male rotor 20 and female rotor 30 (the pair of screw rotors) in the downstream-stage compressor body 2 (the compressor body of the at least one certain stage excluding the upstream-stage compressor body 1) are each configured such that the ratio of the lead at the discharge-side end face 21*c* or 31*c* to the lead at the suction-side end face 21*b* or 31*b* are equal to or lower than 1.5. According to this configuration, it is possible to improve the compressor efficiency due to suppression of a leak of a compressed gas between working chambers through an outer diameter clearance while suppressing an increase in the discharge resistance due to a decrease in the discharge opening area size that accompanies lead change in the male rotor 20 and female rotor 30 (the pair of screw rotors).

In addition, in the two-stage screw compressor according to the present embodiment, regarding each of the male rotor 20 and female rotor 30 (the pair of screw rotors) in the downstream-stage compressor body 2 (the compressor body of the at least one certain stage excluding the upstream-stage compressor body 1), their lead angle at the suction-side end face 21*b* or 31*b* is set to lead angle obtained in accordance with the following formula when the wrap angle is set to any value in the range from 190 degrees to 310 degrees.

[Formula 4]

$$\text{Lead angle} = \tan^{-1}\left(\frac{\text{Length of Rotor lobe section in axial direction}}{0.5 \times \text{Outer diameter of Rotor lobe section} \times \text{Wrap angle [rad]}}\right)$$

According to this configuration, by assigning values of the wrap angles that are typically used for invariable-lead screw rotors (the range from 190 degrees to 310 degrees) to the formula described above for computing a lead angle of an invariable-lead screw rotor, the lead angles at the suction-side end faces which are the start points of variations in the lead angles in the male rotor 20 and female rotor 30 with lead varied can be set to values similar to lead angles used for invariable-lead screw rotors. By setting the lead angles at the suction-side end faces of the male rotor 20 and female rotor 30 with lead varied to values similar to lead angles of invariable-lead screw rotors, the values of the invariable-lead screw rotors can be used for reference about design items of the male rotor 20 and the female rotor 30 such as a displacement volume or a volume ratio, and this results in an easier adjustment of the design items to improve the design efficiency.

[Modification Example of First Embodiment]

Figure 11:
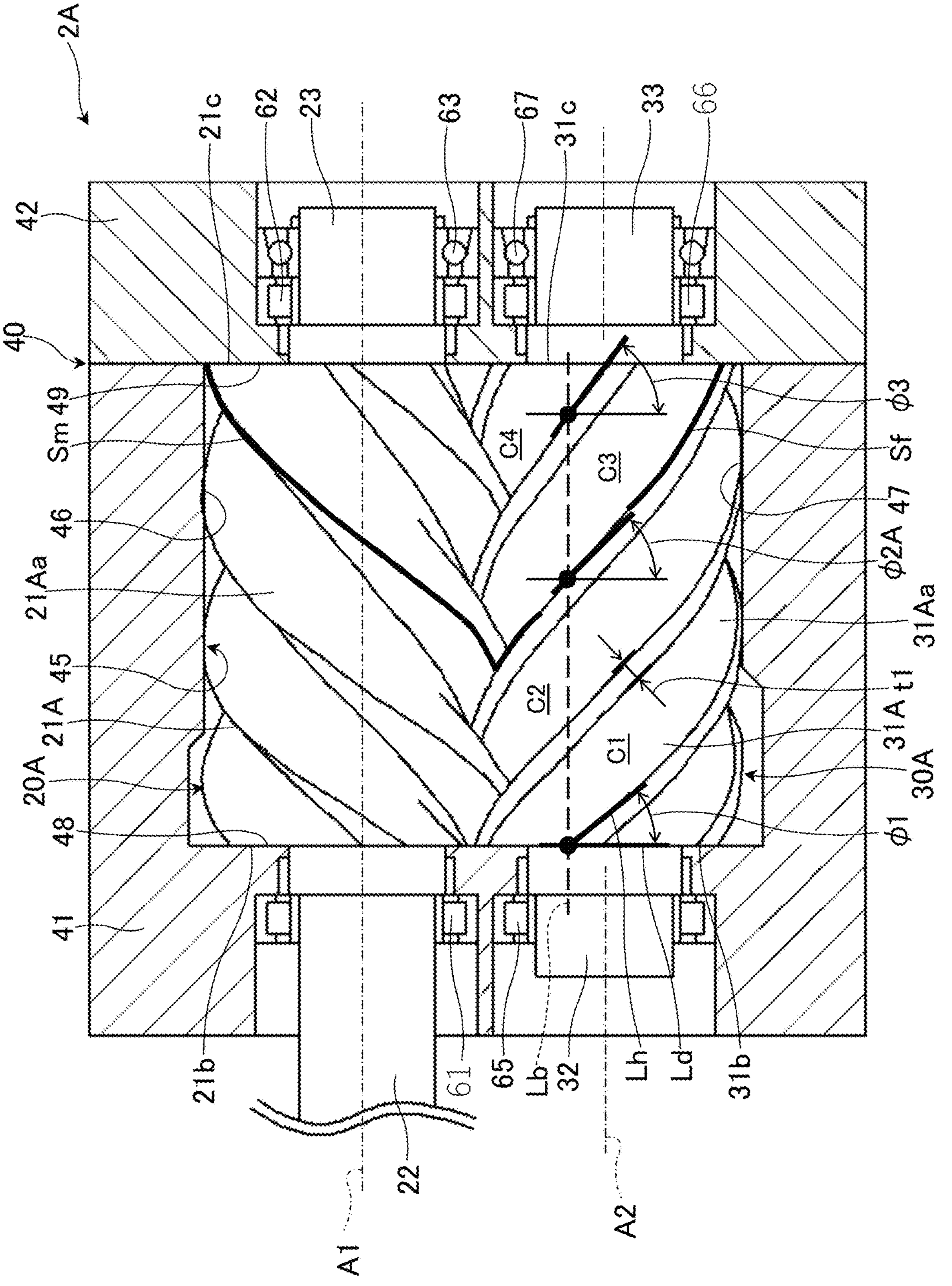
FIG. 11 is a cross-sectional view depicting the structure of a downstream-stage compressor body included as a part of a two-stage screw compressor according to a modification example of the first embodiment of the present invention.

Next, a two-stage screw compressor according to a modification example of the first embodiment is explained by illustrating an example by using FIG. 11. FIG. 11 is a cross-sectional view depicting the structure of the downstream-stage compressor body included as a part of the two-stage screw compressor according to the modification example of the first embodiment of the present invention. Note that reference characters in FIG. 11 which are the same as reference characters depicted in FIG. 1 to FIG. 10 denote similar portions, and accordingly detailed explanations thereof are omitted.

The two-stage screw compressor according to the modification example of the first embodiment depicted in FIG. 11 is different from the two-stage screw compressor (see FIG. 3) according to the first embodiment in the following respects. The downstream-stage compressor body 2 of the first embodiment is configured such that the lead of the male and female rotors 20 and 30 varies over the entire lengths in the axial direction from the suction-side end faces 21*b* and 31*b* to the discharge-side end faces 21*c* and 31*c*. In contrast, in a downstream-stage compressor body 2A according to the present modification example, both male and female rotors 20A and 30A are configured such that their lead are invariable lead that does not vary from the suction-side end faces 21*b* and 31*b* toward at certain positions on the discharge side, and, on the other hand, are configured such that their lead increases gradually from the positions as start points toward the discharge-side end faces 21*c* and 31*c*.

Specifically, for example as depicted in FIG. 11, the lead angle ϕ1 at the suction-side end face 31*b* of the female rotor 30A in the downstream-stage compressor body 2A according to the present embodiment is the same as a lead angle ϕ2A at a certain position which is from the suction-side end face 31*b* toward the discharge side in the axial direction. That is, the female rotor 30A has female lobes 31Aa whose lead angle (ϕ1=ϕ2A) does not vary in the range from the suction-side end face 31*b* to the position in the axial direction where the lead angle is ϕ2A, and the lead is invariable in the certain range on the suction side including the suction-side end face 31*b*. On the other hand, the female rotor 30A is configured such that its lead angle ϕ3 at the discharge-side end face 31*c* is greater than the lead angle ϕ2A. That is, the female rotor 30A has the female lobes 31Aa whose lead angle increases gradually from the position in the axial direction where the lead angle is ϕ2A toward the discharge-side end face 31*c*, and the lead varies in the certain range on the discharge side including the discharge-side end face 31*c*.

Similarly to the female rotor 30A, the male rotor 20A in the downstream-stage compressor body 2A also is an invariable lead rotor with no change in the lead angle from the suction-side end face 21*b* to a certain position in the axial direction. On the other hand, the male rotor 20A is a variable-lead rotor whose lead angle increases gradually from the certain position toward the discharge-side end face 21*c*.

In this manner, in the present modification example, the male rotor 20A and female rotor 30A in the downstream-stage compressor body 2A are configured such that their lead varies in portions closer to the discharge side in entire rotor lobe sections 21A and 31A in the axial direction while their lead is constant in the remaining portions on the suction side in the axial direction. Processing of a screw rotor is easier for the portion with invariable-lead than for the portion with lead varied. Accordingly, in a case where deterioration of the compression efficiency due to a leak of a compressed gas between working chambers through an outer diameter clearance on the suction side in the axial direction is small, by limiting a region with lead varied to a portion on the discharge side in the axial direction, it is possible to realize cost reduction due to prioritizing the ease of manufacturing while attaining the advantage in terms of suppression of a leak of a compressed gas between working chambers through an outer diameter clearance.

As in the first embodiment, in the modification example of the first embodiment mentioned above, by making the lead of the male rotor 20A and female rotor 30A (the pair of screw rotors) in the downstream-stage compressor body 2A (the compressor body of the at least one certain stage) excluding the upstream-stage compressor body 1 (the compressor body of the first stage) increase from the suction side in the axial direction toward the discharge side, the lobe tip thickness t1 of the rotor lobe sections 21A or 31A (the thickness of the lobe tips on a cross-section perpendicular to the extension direction of the lobe tips) increase on the discharge side, and the lengths of the seal lines Sf and Sm extending in the twisting directions of the lobe tips of the rotor lobe sections 21A and 31A decrease. Thereby, it is possible to suppress efficiency deterioration caused by a leak of a compressed gas between working chambers through a clearance (outer diameter clearance) between the lobe tips of the male rotor 20A and female rotor 30A (the pair of screw rotors) and the first inner circumferential face 46 and second inner circumferential face 47 (the inner circumferential face) of the casing 40.

In addition, the male rotor 20A and female rotor 30A (the pair of screw rotors) in the downstream-stage compressor body 2A (the compressor body of the at least one certain stage excluding the upstream-stage compressor body 1) according to the present modification example are each configured such that the lead varies in the portion, including the discharge-side end face 21*c* or 31*c*, closer to the discharge side in the entire length in the axial direction of the rotor lobe section 21A or 31A, and such that the lead is constant in the remaining portion on the suction side in the axial direction. According to this configuration, the advantage can be attained that processing becomes easier for the portion with lead constant, and that a leak of a compressed gas between working chambers through an outer diameter clearance in the portion with lead varied is suppressed.

Second Embodiment

Figure 12:
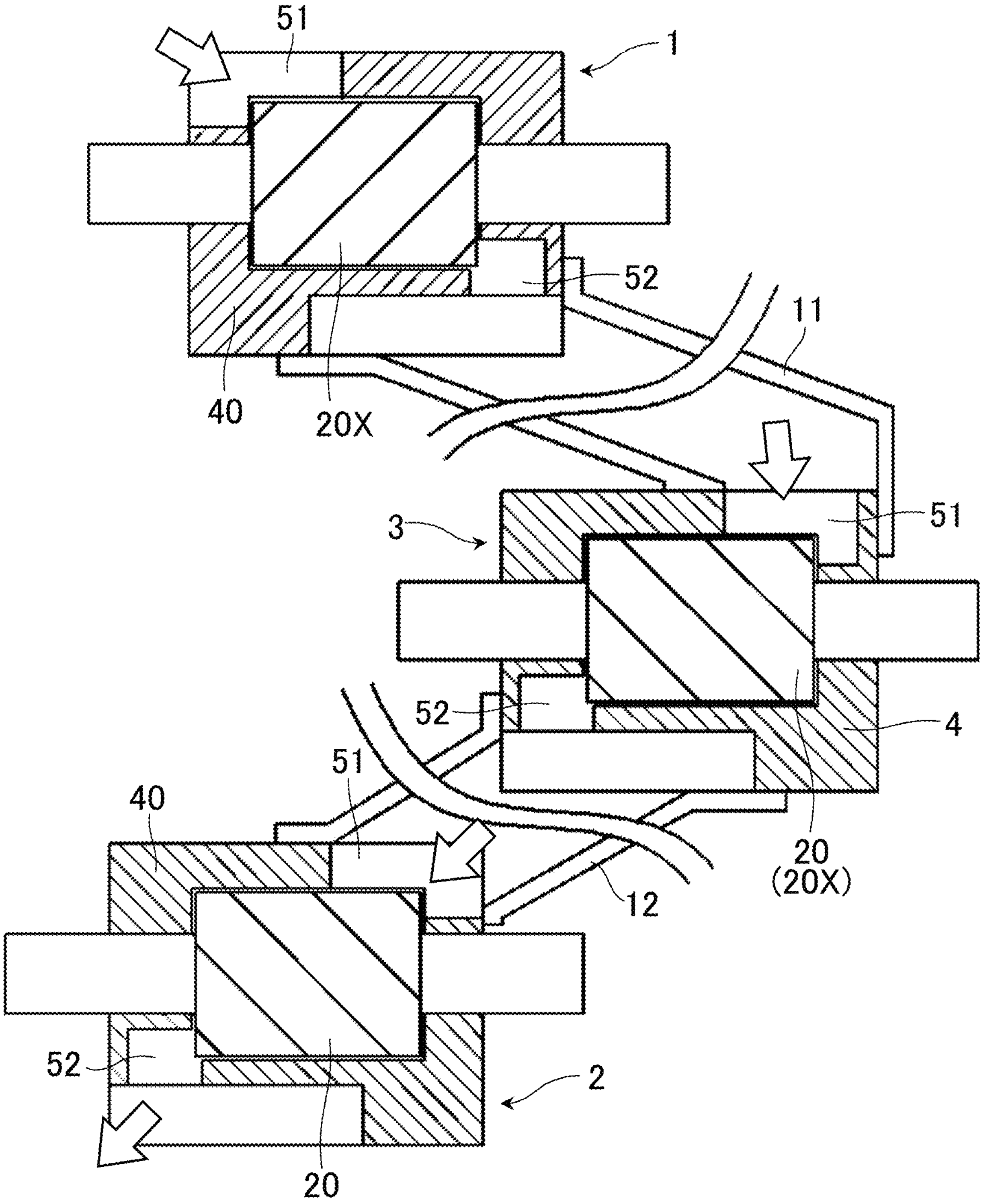
FIG. 12 is a cross-sectional view schematically depicting a three-stage screw compressor as a second embodiment of the present invention.

Next, the configuration of a three-stage screw compressor according to a second embodiment is explained by illustrating an example by using FIG. 12. FIG. 12 is a cross-sectional view schematically depicting the three-stage screw compressor as the second embodiment of the present invention. Reference characters in FIG. 12 which are the same as reference characters depicted in FIG. 1 to FIG. 11 denote similar portions, and accordingly detailed explanations thereof are omitted.

A difference of the second embodiment depicted in FIG. 12 from the first embodiment is that the multi-stage screw compressor of the present invention is applied not to a two-stage screw compressor (see FIG. 1) but to a three-stage screw compressor. When the discharge pressure exceeds 2.3 MPa, the pressure ratios in the compressor bodies 1 and 2 of the respective stages in a two-stage screw compressor increase, and it is appropriate in some cases to adopt a three-stage screw compressor.

Among compressor bodies of a plurality of stages that compress a gas in sequence, the three-stage screw compressor includes: a first-stage compressor body 1 as a compressor body of the first stage positioned at the upstream end; a third-stage compressor body 2 as a compressor body of the last stage positioned at the downstream end; and a second-stage compressor body 3 as a compressor body of the middle stage positioned in the middle between the first-stage compressor body 1 and the third-stage compressor body 2. The three-stage screw compressor boosts the pressure of a gas by causing the second-stage compressor body 3 to suck in a gas compressed and discharged by the first-stage compressor body 1 and further compress the gas, and causing the third-stage compressor body 2 to suck in the compressed gas discharged by the second-stage compressor body 3 and further compress the gas. The discharge side of the first-stage compressor body 1 and the suction side of the second-stage compressor body 3 are connected via a first connecting flow path 11. The discharge side of the second-stage compressor body 3 and the suction side of the third-stage compressor body 2 are connected via a second connecting flow path 12. Note that the first connecting flow path 11 and the second connecting flow path 12 can have configuration provided with cooling means such as intercoolers (not depicted).

In the present embodiment, each of the male and female rotors 20 and 30 of at least the third-stage compressor body 2 among the first-stage compressor body 1, the second-stage compressor body 3, and the third-stage compressor body 2 is configured such that its lead increases gradually from the suction side toward the discharge side. The operation differential pressure of the third-stage compressor body 2 is greater than the operation differential pressure of the first-stage compressor body 1 and the operation differential pressure of the second-stage compressor body 3. For example, in a case where the discharge pressure of the three-stage screw compressor is 2.3 MPa, the operation differential pressure of the third-stage compressor body 2 is as high as 1.493 MPa. Accordingly, the problem of deterioration of the compression efficiency caused by a leak of a compressed gas between working chambers through an outer diameter clearance is of more concern for the third-stage compressor body 2 than for the first-stage compressor body 1 and the second-stage compressor body 3. In view of this, it is aimed to effectively suppress a leak of a compressed gas between working chambers through an outer diameter clearance, and suppress deterioration of the compression efficiency by using the male and female rotors 20 and 30 whose lead increases from the suction side toward the discharge side for the third-stage compressor body 2 with the greatest operation differential pressure.

In the present embodiment, the male and female rotors 20 (the female rotor is not depicted) of the second-stage compressor body 3 also may be configured such that their lead increases gradually from the suction side toward the discharge side. Since the operation differential pressure of the second-stage compressor body 3 is greater than the operation differential pressure of the first-stage compressor body 1, the problem of deterioration of the compression efficiency caused by a leak of a compressed gas between working chambers through an outer diameter clearance should be considered in some cases. In view of this, by using the male and female rotors 20 whose lead increases from the suction side toward the discharge side also for the second-stage compressor body 3 whose operation differential pressure is relatively great, it is possible to realize still higher efficiency of the entire three-stage screw compressor by suppressing a leak of a compressed gas between working chambers through an outer diameter clearance in the second-stage compressor body 3.

On the other hand, in a case where the operation differential pressure of the second-stage compressor body 3 is relatively small, and deterioration of the compression efficiency caused by a leak of a compressed gas between working chambers through an outer diameter clearance in the second-stage compressor body 3 is relatively small, the male and female rotors 20X can also be configured as invariable-lead rotors. In this case, it is possible to realize cost reduction since manufacturing of the male and female rotors 20X becomes easier as compared with screw rotors with lead varied.

As in the first embodiment, in the three-stage screw compressor (multi-stage screw compressor) according to the second embodiment mentioned above, by making the lead of the male rotor 20 and female rotor 30 (the pair of screw rotors) in the third-stage compressor body 2 (the compressor body of the at least one certain stage excluding the first-stage compressor body 1) increase from the suction side in the axial direction toward the discharge side, the lobe tip thickness t1 of the rotor lobe sections 21 or 31 increase on the discharge side, and the lengths of the seal lines Sf and Sm extending in the twisting directions of the lobe tips of the rotor lobe sections 21 and 31 decrease. Thereby, it is possible to suppress efficiency deterioration caused by a leak of a compressed gas between working chambers through a clearance (outer diameter clearance) between the lobe tips of the male rotor 20 and female rotor 30 (the pair of screw rotors) and the first inner circumferential face 46 and second inner circumferential face 47 (the inner circumferential face) of the casing 40.

In addition, in the three-stage screw compressor (the multi-stage screw compressor) according to the present embodiment, the male rotors 20 and female rotors 30 (the pairs of screw rotors) in the second-stage compressor body 3 and third-stage compressor body 2 (the compressor bodies of the respective stages) excluding the first-stage compressor body 1 (the compressor body of the first stage) among the first-stage compressor body 1, the second-stage compressor body 3, and the third-stage compressor body 2 (the plurality of stages of compressor bodies) are each configured such that their lead increases from the suction side in the axial direction of the rotor lobe section 21 or 31 toward the discharge side.

According to this configuration, it is possible to suppress a leak of a compressed gas between working chambers through an outer diameter clearance in the second-stage compressor body 3 and the third-stage compressor body 2 whose operation differential pressures are greater than that of the first-stage compressor body 1, and this effectively suppresses deterioration of the overall compression efficiency of the three-stage screw compressor (the multi-stage screw compressor).

OTHER EMBODIMENTS

Note that the present invention is not limited to the embodiments mentioned above, but includes various modification examples. The embodiments described above are explained in detail for explaining the present invention in an easy-to-understand manner, and the present invention is not necessarily limited to those including all constituent elements explained. That is, it is possible to replace some of constituent elements of an embodiment with constituent elements of another embodiment, and it is also possible to add constituent elements of an embodiment to constituent elements of another embodiment. In addition, some of constituent elements of each embodiment can also have other constituent elements additionally, be deleted or be replaced.

For example, in the embodiment mentioned above, it is explained that the lead angle ϕ1 at the lobe tip point on the suction-side end face 31*b* of the female rotor 30 in the downstream-stage compressor body 2 is set to the same angle as the lead angle ϕ10 at the lobe tip point on the suction-side end face 131*b* of the female rotor 130 in the screw compressor 102 according to the comparative example. However, the lead angle ϕ1 at the lobe tip point on the suction-side end face 31*b* of the female rotor 30 in the downstream-stage compressor body 2 can also be set greater than or smaller than the lead angle ϕ10 at the lobe tip point on the suction-side end face 131*b* of the female rotor 130 in the screw compressor 102 according to the comparative example.

In addition, the embodiment mentioned above depicts an example of the configuration in which the male rotors 20 and 20X of the respective stages are driven by revolution drive sources. However, in other possible configuration, the female rotors 30 and 30X of the respective stages are driven by revolution drive sources. In addition, in other possible configuration, the male rotor 20X of the upstream-stage compressor body 1 is driven by a revolution drive source; on the other hand, the female rotor 30 of the downstream-stage compressor body 2 is driven by a revolution drive source. In addition, in other possible configuration, the male rotors 20 and 20X and female rotors 30 and 30X of the respective stages of the upstream-stage compressor body 1 and downstream-stage compressor body 2 are driven in opposite manners. In addition, in other possible configuration, the male and female rotors 20, 20X, 30, and 30X of the respective stages are driven synchronously. In addition, in other possible configuration, one revolution drive source revolves a main gear, and sub-gears that mesh with the main gear drive the compressor bodies 1 and 2 of the respective stages. In addition, in other possible configuration, a revolution drive source is disposed on each of the compressor bodies 1 and 2 of the plurality of stages, and the compressor bodies 1 and 2 are driven individually.

In addition, the first embodiment and modification thereof mentioned above depicts an example that the present invention is applied to the two-stage screw compressor including the upstream-stage compressor body 1, the downstream-stage compressor body 2 or 2A, and the connecting flow path 10 connecting them with each other. In addition, the second embodiment depicts an example that the present invention is applied to the three-stage screw compressor including the first-stage compressor body 1, the second-stage compressor body 3, the third-stage compressor body 2, and the first connecting flow path 11 and second connecting flow path 12 connecting them with each other. However, in other possible configuration of the present invention, the upstream-stage compressor body 1 and downstream-stage compressor body 2, and the connecting flow path 10 connecting them with each other form one set, and a plurality of the sets are connected. In addition, in other possible configuration, the first-stage compressor body 1, the second-stage compressor body 3, the third-stage compressor body 2, and the first connecting flow path 11 and second connecting flow path 12 connecting them with each other form one set, and a plurality of the sets are connected with each other. That is, configuration in which compressors of a plurality of stages and a connecting flow path connecting them with each other form one set, and configuration of a multi-stage screw compressor in which compressors of a plurality of stages and connecting flow paths connecting them with each other form one set, and a plurality of the sets are connected with each other are possible.

In addition, the second embodiment depicts an example that at least the third-stage compressor body 2 among the first-stage compressor body 1, the second-stage compressor body 3, and the third-stage compressor body 2 has a configuration in which the lead of the male and female rotors 20 and 30 varies. However, in other possible configuration, only the second-stage compressor body 3 among the first-stage compressor body 1, the second-stage compressor body 3, and the third-stage compressor body 2 has a configuration in which lead of the male and female rotors 20 and 30 varies. In a case where the stage pressure ratio in the second-stage compressor body 3 is set greater than the stage pressure ratio in the third-stage compressor body 2 for some reason, it is also possible to apply invariable-lead configuration prioritizing ease of manufacturing for the third-stage compressor body 2 while prioritizing application of configuration with lead changing for the second-stage compressor body 3. That is, configuration in which the lead of the male and female rotors 20 and 30 varies may be applied to a compressor body of at least one certain stage among the compressor bodies of the plurality of stages, excluding the first-stage compressor body 1 positioned at the upstream end.

DESCRIPTION OF REFERENCE CHARACTERS

- 1: Upstream-stage compressor body or first-stage compressor body (compressor body of first stage)
- 2: Downstream-stage compressor body or third-stage compressor body (compressor body of last stage)
- 3: Second-stage compressor body (compressor body)
- 20, 20A, 20X: Male rotor (screw rotor)
- 21, 21A: Rotor lobe section
- 21*a*: Male lobe (lobe)
- 21*b*: Suction-side end face
- 21*c*: Delivery-side end face
- 30, 30A: Female rotor (screw rotor)
- 31, 31A: Rotor lobe section
- 31*a*, 31Aa: Female lobe (lobe)
- 31*b*: Suction-side end face
- 31*c*: Delivery-side end face
- 40: Casing
- ϕ1, ϕ2, ϕ2A, ϕ3, ϕ4: Lead angle

The invention claimed is:

1. A multi-stage screw compressor comprising:

a plurality of stages of compressor bodies that compress a gas in sequence, wherein each stage of the plurality of stages of compressor bodies has a pair of screw rotors that are housed revolvably in a casing in a mutually meshing state, each of the screw rotors includes a rotor lobe section, the rotor lobe section having a suction-side end face and a discharge-side end face at one end and another end in an axial direction and having a twisted lobe extending from the suction-side end face to the discharge-side end face, and each of the screw rotors in a compressor body of at least one certain stage, excluding a compressor body of a first stage positioned at an upstream end, among the plurality of stages of compressor bodies is configured such that lead increases from a suction side in the axial direction of the rotor lobe section toward a discharge side, the lead representing a length of advance in the axial direction for each revolution of the twisted lobe.

2. The multi-stage screw compressor according to claim 1, wherein each of the screw rotors in a compressor body of a last stage positioned at a downstream end is configured such that the lead increases from the suction side in the axial direction of the rotor lobe section toward the discharge side.

3. The multi-stage screw compressor according to claim 1, wherein each of the screw rotors in a compressor body of each stage, excluding the compressor body of the first stage, among the plurality of stages of compressor bodies is configured such that the lead increases from the suction side in the axial direction of the rotor lobe section toward the discharge side.

4. The multi-stage screw compressor according to claim 1, wherein each of the screw rotors in the compressor body of the at least one certain stage is configured such that the lead varies over an entire length of the rotor lobe section in the axial direction.

5. The multi-stage screw compressor according to claim 1, wherein each of the screw rotors in the compressor body of the at least one certain stage is configured such that the lead varies in a portion, including the discharge-side end face, closer to the discharge side in an entire length of the rotor lobe section in the axial direction, and such that the lead is constant in a remaining portion on the suction side in the axial direction.

6. The multi-stage screw compressor according to claim 1, wherein a pressure ratio is equal to or lower than 4.5 in the compressor body of the at least one certain stage.

7. The multi-stage screw compressor according to claim 6, wherein each of the screw rotors in the compressor body of the at least one certain stage is configured such that a ratio of lead at the discharge-side end face to lead at the suction-side end face are equal to or lower than 1.5.

8. The multi-stage screw compressor according to claim 1, wherein, in each of the pair of screw rotors in the compressor body of the at least one certain stage, a lead angle at the suction-side end face is set to a lead angle obtained in accordance with a following formula:

[Formula 1]

$$\text{Lead angle} = \tan^{-1}\left(\frac{\text{Length of Rotor lobe section in axial direction}}{0.5 \times \text{Outer diameter of Rotor lobe section} \times \text{Wrap angle [rad]}}\right)$$

where wrap angle is set to any value in a range from 190 degrees to 310 degrees.

* * * * *